3,560,915
SONIC AMPLITUDE LOGGING
Sheldon E. Elliott and Joe P. Lindsey, Bartlesville, Okla., assignors to Phillips Petroleum Company, a corporation of Delaware
Filed Dec. 12, 1966, Ser. No. 601,081
Int. Cl. H03k 13/02
U.S. Cl. 340—18                              6 Claims

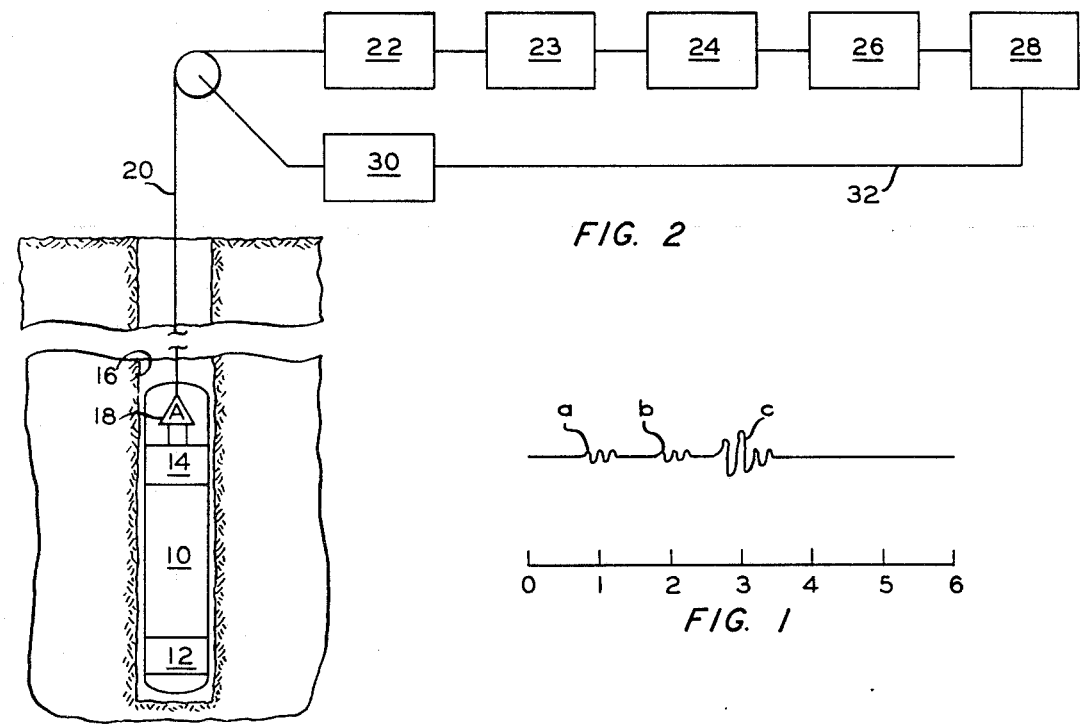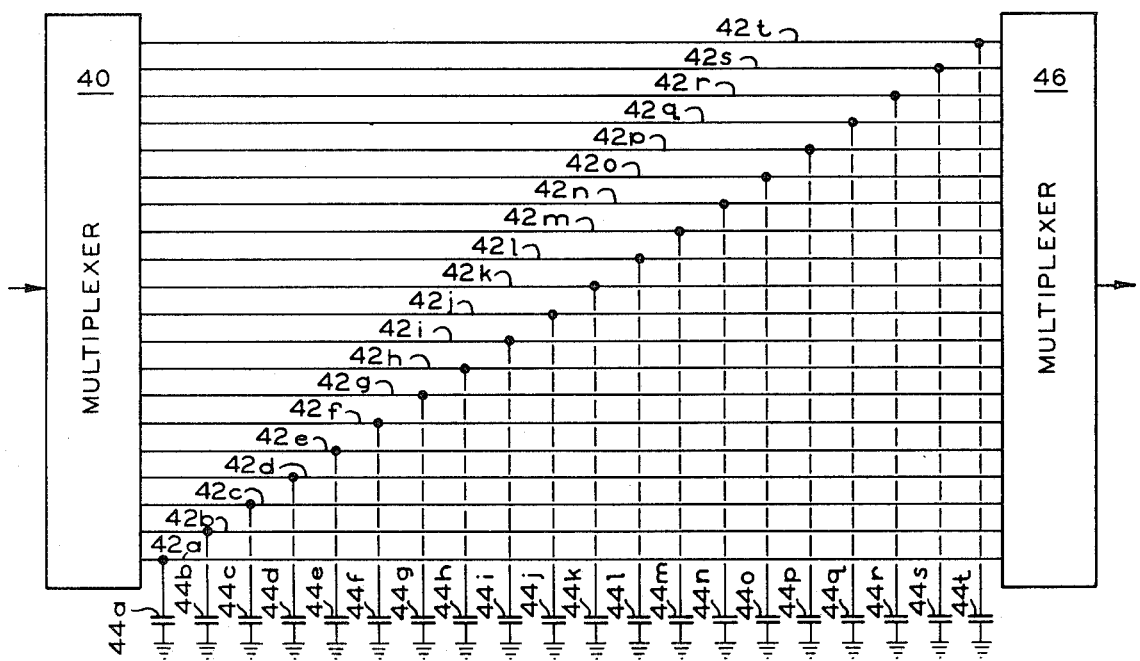
FIG. 2
FIG. 1
FIG. 3
INVENTORS
S. E. ELLIOTT
J. P. LINDSEY
BY Young & Quigg
ATTORNEYS

United States Patent Office 3,560,915
Patented Feb. 2, 1971

ABSTRACT OF THE DISCLOSURE

A sonic signal generator and receiver are placed in vertical spaced relationship in a well bore. The receiver establishes an analog output signal. This signal is converted to a corresponding digital signal by dividing the analog signal into successive increments at a first rate. The resulting increments are passed to individual signal storage devices. The increments are subsequently removed from the storage devices in sequence at a preselected second rate which is slower than the first rate, and the removed increments are converted into corresponding digitized signals.

---

This invention relates to sonic amplitude logging. In one of its aspects it relates to a method and apparatus for sonic amplitude logging to determine characteristics of subsurface strata from amplitude and speed of signals detected in a bore hole wherein the signals detected within the bore hole are digitized for computation of the shear velocity, compression velocity, and attenuation from which information the density of the test strata can be computed.

In seismic exploration wherein reflections determine the configuration of subsurface strata, it is necessary to perform further tests to determine the composition and characteristics of the subsurface strata. These tests consist of lowering a sonic generator and a receiver into a bore hole and detecting the signal resulting from the generation at the sonic source. These tests, which are known as sonic amplitude logging, produce information from which the character of the subsurface strata can be determined.

The first 1,000 feet of well logging is most difficult. These upper layers of material are less dense and consequently require greater energy to propagate sounds therethrough. Further, in these sections there is a great deal of background noise.

FIG. 1 shows an idealized waveform obtained from a receiver in sonic amplitude logging. Event $a$ indicates the longitudinal refracted wave arrival, event $b$ represents a shear arrival, and event $c$ represents the water or mud arrival. In those areas in which testing is done above the water table there will be no water or mud arrival. As can be seen from FIG. 1, the water arrival signal dwarfs the other two signals. Further, the three signals are rather close together. It is thus difficult to accurately record waveforms $a$, $b$ and $c$ and work with the same without distorting or obliterating one or more signals.

I have now discovered that the detected information can be accurately recorded such that accurate calculations of shear velocity and compressional velocity can be made by digitizing the detected signals.

Digitizing seismic signals is known. See Enright, The Oil and Gas Journal, July 27, 1964, pages 236 through 244. However, in seismic work it is the arrival times which are important and the frequency of the detected waves is of the order of 20 to 200 c.p.s. In some amplitude logging many waveforms have frequencies greater than 10,000 cycles per second. Thus the equipment used for seismic work cannot readily be adapted to sonic amplitude logging since the rate of sampling and recording will not be sufficient to record higher frequency wave forms. We have now discovered that this equipment can be adapted for sonic amplitude loggings by sampling the signal at a proper speed to obtain the proper resolution, storing the sampled information and playing back the same at a speed at which the equipment can digitize and convert the information.

Digitized information has heretofore been used in well logging. However, it has only been used to record arrival times. The methods and apparatus used have a sampling rate which is too slow to accurately record the waveforms in sonic amplitude logging. I have now discovered that if the entire signal is digitized by using a fast sampling rate, other more valuable information can be obtained.

Of various aspects of this invention one or more of the following or other objects can be obtained. It is an object of this invention to provide an improved method and apparatus for sonic amplitude well logging.

It is a further object of this invention to provide an improved method and apparatus for obtaining subsurface strata information.

It is still a further object of this invention to provide an improved method and apparatus for determining shear wave velocity, bore hole velocity, compressional velocity, and attenuation of sonic waves in subsurface strata.

According to the invention sonic amplitude logging information is digitized for calculation of shear velocity, compressional velocity, and density of the test strata. Alternately, the digitized information is compared with standard digitized well logging information of subsurface strata having known characteristics and the characteristics of the test strata are thereby obtained. Generally, a sonic source and a detector are lowered into a bore hole, the sonic source is detonated and at least one detector receives the transient waveform from the sonic source. The transient waveform is preferably filtered to remove frequencies, sampled, digitized and recorded. The filter is so adjusted relative to the speed of digitizing and recording such that the identity of the waveform can be ascertained.

In one embodiment high frequencies are sampled by the use of a device which samples at a rate fast enough to accurately reproduce the desired frequency, the sample signal is stored, and played back at a second slower rate so that the digitizing and recording equipment can handle or process the information.

The invention will now be exemplified by reference to the accompanying drawing in which FIG. 2 shows a schematic of a device according to the invention and FIG. 3 is a schematic delay unit which can be used in practicing the invention.

Referring now to the drawings, a casing 10 having a sonic source 12 and a receiver 14 is lowered into bore hole 16 to a certain depth. The sonic source 12 is detonated through a remote device which passes a current down through cable 20 which also supports the casing within the bore hole. The sonic source can be any type of source which generates a high energy acoustical signal. Preferably, the acoustical source is a device similar to that disclosed and claimed in copending Ser. No. 574,185, now Pat. No. 3,407,384, or copending Ser. No. 578,574, now Pat. No. 3,341,811. The sonic receiver can be any suitable device for sensing acoustical signals and, accordingly, developing an electrical signal responsive thereto. A suitable receiver is disclosed and claimed in copending Ser. No. 575,877, now Pat. No. 3,360,773. The signal received by receiver 14 is converted to an electrical wave form and amplified in amplifier 18, passed through cable 20 to a low frequency filter 22 (alias filter) in which higher frequencies are filtered out. In one embodiment the filter will remove all signals whose frequency is greater than 10,000 to 15,000 cycles per second. The filtered signal is passed to a delay unit 23, a sample and hold amplifier 24 which samples the signal from delay unit 23 at a given rate sufficient that the signal so sampled can be reproduced accurately. The signal so sampled is held and played back in delay unit 23 at a rate at which the analog to digital converter 26 can process the information and print the same on digital recorder 28. A depth measuring device 30 can be provided to indicate on the digital recording made in recorder 28 the depth at which the measurement is made. Signal line 32 is provided to transmit the signal from the depth measuring device 30 to digital recorder 28. The sample and hold unit 24 can be any suitable device which samples a signal, holds the sampled signal and passes the sampled signal to a digital converter. A suitable sample and hold unit is a Model 5500, obtainable from Preston Scientific Inc., Anaheim, Calif.

Further according to the invention, the alias or low frequency filter can be set to pass those frequencies which are required to properly analyze the test strata. The filter can be set at 50,000 to 100,000 cycles per second and the sampling unit 24 can sample at a rate fast enough to obtain enough information to accurately reproduce the sampled signals. The alias or low frequency pass filter can be any suitable filter such as that described in The Radio Amateur's Handbook, 1966, Forty-third edition, page 50, published The American Radio Relay League, Inc.; Newington, Conn., U.S.A.

The analog digital converter 26 and the digital recorder can be that equipment described in the above-mentioned Oil and Gas Journal article made by Geophysical Service Inc., Dallas, Tex. The depth measuring device can be any suitable device for indicating the depth of casing 10. Such a device is the Standard Measuring Device sold by the Halliburton Co., Duncan, Okla.

Preferably, the sampling done by delay unit 23 is done at the rate of one sample in the range of every 4 to 10 microseconds and the conversion is preferably into at least a 12-bit digital number. This will give the accuracy required to sample signals having a frequency up to 50,000 to 100,000 cycles per second. In using this equipment, a minimum of two channels, i.e., two detectors, with associated signal processing equipment shown in FIG. 2 are desirable.

In commercial equipment now available, the conversion from analog to digital form of information and recording of the information takes place at the rate of 1 sample every 31¼ microseconds. This will yield a 15-bit number on a single channel. Since it is desirable to obtain information at a much faster rate using this equipment, a delay unit has been devised. As has been hereinbefore mentioned, the delay is a device which samples at a desired rate, for example every 4 to 10 microseconds, stores the sampled signal thus obtained, and plays back the sampled signal at a slower rate, for example at one sample every 30–35 microseconds, to allow the converter and recorder to digest the information. In this manner conventional equipment can be used to sample high frequency signals.

A suitable delay unit is shown in FIG. 3, a description of which will follow.

With reference now to FIG. 3, the signal from the filter is passed to a multiplexer 40 which samples the signal at a rate which is required to accurately sample a signal having a given frequency. For example, a signal whose frequency is about 30 kilocycles per second would require a sampling interval of about 10 microseconds with about 200 sample points required. A signal corresponding to each sample obtained from the multiplexer 40 is passed through a lead 42 to a condenser 44. In the example shown in FIG. 2, lead 42a connects with condenser 44a, lead 42b connects with condenser 44b, etc. Each lead 42a through 42t is also connected with multiplexer 46 which reads back the stored signals in condensers 44a through 44t at a second rate, which rate is commensurate with the desirable rate of digitizing for the digital converter 26.

Once the digital information has been obtained, many calculations or comparisons can be made. For example, the digital information can be converted back to analog form and printed out for accurate study; or computations can be made within a computer using the digital information, for example the arrival times of the shear velocity event, the compression velocity event, the bore hole velocity event and the amplitude of each of these can be used in calculating the density and permeability of the test formation. Alternately, the digital information can be fed to a computer such as a Scientific Data Systems, Computer Number 92, 1649 17th St., Santa Monica, Calif., which can compare the wave forms thus obtained in digital or analog form to other standard wave forms obtained from hundreds or thousands of subsurface strata having known characteristics. In this manner the characteristics of the bore hole can be accurately and rapidly predicted.

Reasonable variation and modification are possible within the scope of the foregoing disclosure, the drawings, and the appendant claims to the invention without departing from the spirit thereof.

We claim:

1. A method of sonic amplitude logging which comprises:
   positioning a sonic signal generator and a sonic signal receiver in a well bore in vertical spaced relationship with one another, said receiver establishing an analog output signal;
   actuating said generator to establish a sonic signal;
   dividing the analog output signal into successive increments at a preselected first rate;
   passing the resulting increments to individual signal storage devices;
   subsequently removing the increments of the stored signal from the storage devices in sequence at a preselected second rate which is slower than the first rate;
   converting the removed increments of stored signal into corresponding digitized signals; and
   passing the resulting digitized signals to a signal receiving device.

2. The method of claim 1 wherein said analog signal is divided into successive increments at a rate in the range of one increment per 4 to 10 microseconds, and said increments are subsequently removed from the storage devices at a rate in the range of one increment per 30 to 35 microseconds.

3. The method of claim 1 wherein the analog signal is passed through a filter to remove signals having frequencies greater than 15,000 cycles per second prior to the dividing step.

4. Apparatus for sonic amplitude logging comprising:
   a sonic signal generator and a sonic signal receiver positioned in a well bore in vertical spaced relationship with one another, said receiver establishing an analog output signal;
   a signal digitizing means;
   a plurality of signal storage means;
   first switching means connected between said receiver and said storage means to pass successive increments of the output analog signal from said receiver to respective ones of said storage means at a first frequency rate;
   second switching means connected between said storage means and said digitizing means to pass signals stored on respective ones of said storage means successively to said digiting means at a second frequency rate which is slower than said first rate;
   digital signal receiving means; and
   means connecting the output of said signal digitizing means to said receiving means.

5. The apparatus of claim 4 wherein said plurality of signal storage means comprises a plurality of capacitors, said first switching means comprises a first multiplexer connected to pass increments of the analog signal selectively to individual ones of said capacitors in sequence, and said second switching means comprises a second multiplexer connected to pass signals stored on said capacitors sequentially from individual ones of said capacitors to said digitizing means.

6. The apparatus of claim 4, further comprising filter means connected between said receiver and said first switching means, said filter means serving to remove frequencies greater than a predetermined value.

References Cited

UNITED STATES PATENTS

| | | | |
|---|---|---|---|
| 3,315,223 | 4/1967 | Hibbard et al. | 340—15.5 |
| 3,345,608 | 10/1967 | Brown et al. | 340—15.5 |
| 3,388,375 | 6/1968 | Sloughter | 340—18 |
| 3,405,349 | 10/1968 | Moran | 340—397 |
| 3,419,853 | 12/1968 | Silverman | 340—15.5 |
| 3,150,374 | 9/1964 | Dunstein | 179—15.55 |
| 3,462,555 | 8/1969 | Presti | 179—15 |
| 3,305,785 | 2/1967 | Carroll, Jr. | 179—15 |

OTHER REFERENCES

Jursik: "Improved Signal Commutator," IBM Technical Disclosure, vol. 6, No. 8, p. 38, January 1964.

MAYNARD R. WILBUR, Primary Examiner

J. GLASSMAN, Assistant Examiner

U.S. Cl. X.R.

340—15.5, 347